United States Patent
Ryu et al.

(10) Patent No.: US 10,312,020 B2
(45) Date of Patent: Jun. 4, 2019

(54) MULTILAYER CERAMIC CAPACITOR

(71) Applicant: TAIYO YUDEN CO., LTD., Taito-ku, Tokyo (JP)

(72) Inventors: Minoru Ryu, Takasaki (JP); Mikio Tahara, Takasaki (JP); Hirokazu Orimo, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/600,609

(22) Filed: May 19, 2017

(65) Prior Publication Data

US 2017/0345564 A1 Nov. 30, 2017

(30) Foreign Application Priority Data

May 24, 2016 (JP) .................................. 2016-103040

(51) Int. Cl.
| | | |
|---|---|---|
| *H01G 4/30* | (2006.01) | |
| *H01G 4/005* | (2006.01) | |
| *H01G 4/008* | (2006.01) | |
| *H01G 4/232* | (2006.01) | |
| *H01G 4/228* | (2006.01) | |
| *H01G 4/12* | (2006.01) | |
| *H01G 4/10* | (2006.01) | |
| *H01M 4/32* | (2006.01) | |

(52) U.S. Cl.
CPC ........... *H01G 4/1209* (2013.01); *H01G 4/005* (2013.01); *H01G 4/10* (2013.01); *H01G 4/2325* (2013.01); *H01G 4/30* (2013.01); *H01G 4/0085* (2013.01); *H01G 4/12* (2013.01); *H01M 4/32* (2013.01)

(58) Field of Classification Search
CPC .......... H01G 4/30; H01G 4/228; H01G 4/232; H01G 4/005; H01G 4/008; H01G 4/10
USPC ............ 361/303, 321.1, 301.4, 306.1, 306.3, 361/321.2
See application file for complete search history.

(56) References Cited

U.S. PATENT DOCUMENTS 4,701,827 A * 10/1987 Fujikawa ............. H01G 4/2325
361/309
2012/0162856 A1 6/2012 Lee et al.

FOREIGN PATENT DOCUMENTS

| JP | S54140959 A | 11/1979 |
| JP | 10188669 A * | 7/1998 |

* cited by examiner

*Primary Examiner* — Eric W Thomas
*Assistant Examiner* — Arun Ramaswamy
(74) *Attorney, Agent, or Firm* — Law Office of Katsuhiro Arai

(57) ABSTRACT

In an embodiment, a multilayer ceramic capacitor 10 has a first external electrode 12 and a second external electrode 13 that each contain metal grains MP and dielectric grains DP, where an oxide of the same metal element constituting the metal grain MP, or MO, is present at the interface between the metal grain MP and the dielectric grain DP. The multilayer ceramic capacitor can prevent the hardness of its external electrodes from dropping, even when the external electrodes contain metal grains and dielectric grains.

13 Claims, 1 Drawing Sheet

MULTILAYER CERAMIC CAPACITOR

BACKGROUND

Field of the Invention

The present invention relates to a multilayer ceramic capacitor using external electrodes that contain metal grains and dielectric grains.

Description of the Related Art

With conventional multilayer ceramic capacitors, it is known that, when external electrodes are produced, an external electrode paste that contains, as a common material, the dielectric material constituting the primary component of the capacitor body except for the internal electrode layers, is used to increase the adhesion strength of the external electrodes with respect to the capacitor body (refer to Patent Literature 1, for example). For example, this external electrode paste is applied on parts of the surface of the capacitor body, dried, and then baked (sintered), to form the intended external electrodes.

On the other hand, there is a concern that external electrodes produced using an external electrode paste that contains such common material may crack at locations where dielectric grains and metal grains are bonded together, in which case the strength of the external electrodes in the direction toward the interior of the film will decrease compared to when the paste does not contain any dielectric grains, and their hardness, such as Vickers hardness, will drop as a result. In particular, this concern grows when the thickness of external electrodes is reduced, such as to 10 μm or less, in order to meet the demand for smaller multilayer ceramic capacitors.

BACKGROUND ART LITERATURES

[Patent Literature 1] Japanese Patent Laid-open No. Sho 54-140959

[Patent Literature 2] US Patent Laid-open No. 2012/0162856

SUMMARY

An object of the present invention is to provide a multilayer ceramic capacitor that can prevent the hardness of its external electrodes from dropping, even when the external electrodes contain metal grains and dielectric grains.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor using external electrodes that contain metal grains and dielectric grains, where a metal oxide of the same metal element constituting the metal grain is present at the interface between the metal grain and the dielectric grain of the external electrodes.

According to the multilayer ceramic capacitor pertaining to the present invention, drop in the hardness of its external electrodes can be prevented, even when the external electrodes contain metal grains and dielectric grains.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1A is a plan view of a multilayer ceramic capacitor to which the present invention is applied, while

DESCRIPTION OF THE SYMBOLS

10 - - - Multilayer ceramic capacitor, 11 - - - Capacitor body, 11a - - - Capacitive part, 11a1 - - - Internal electrode layer, 11a2 - - - Dielectric layer, 11b - - - Dielectric cover part, 12, 12-1, 12-2 - - - First external electrode, 13, 13-1, 13-2 - - - Second external electrode, MP - - - Metal grain, DP - - - Dielectric grain, MO - - - Metal oxide.

DETAILED DESCRIPTION OF EMBODIMENTS

Figure 1A:
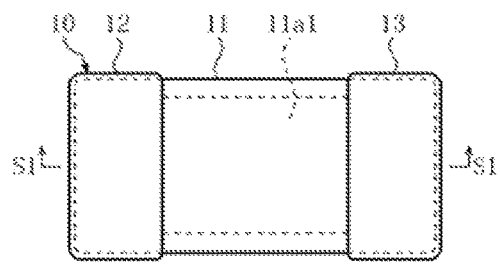
Figure 1B:
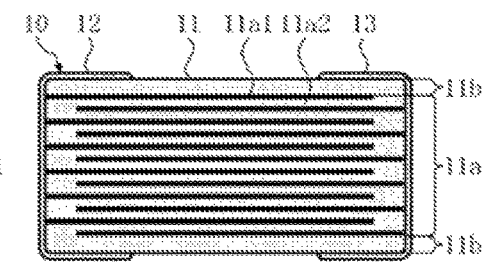
FIG. 1B is a cross section view of FIG. 1A along line S1-S1.
Figure 2:
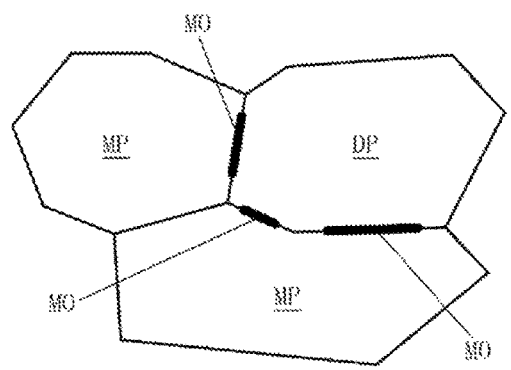
FIG. 2 is a drawing illustrating how the interfaces between metal and dielectric grains would look in the external electrodes shown in FIGS. 1A and 1B.

First, the structure of a multilayer ceramic capacitor 10 to which the present invention is applied is explained using FIGS. 1A to 2. In this explanation, the lateral direction in FIG. 1A is denoted as "length direction," the vertical direction in FIG. 1A is denoted as "width direction," and the vertical direction in FIG. 1B is denoted as "height direction," while the dimensions along these directions are denoted as "length," "width" and "height," respectively.

As shown in FIGS. 1A and 1B, the multilayer ceramic capacitor 10 has a capacitor body 11 of roughly rectangular solid shape, a first external electrode 12 provided on one length-direction end of the capacitor body 11, and a second external electrode 13 provided on the other length-direction end of the capacitor body 11.

As shown in FIG. 1B, the capacitor body 11 has a capacitive part 11a constituted by multiple internal electrode layers 11a1 that are stacked on top of each other with dielectric layers 11a2 in between, as well as dielectric cover parts 11b that respectively cover both sides of the capacitive part 11a in the height direction. The multiple internal electrode layers 11a1 have roughly the same rectangular profile and roughly the same thickness, and their ends are connected to the first external electrode 12 and second external electrode 13 alternately in the height direction. It should be noted that, while a total of 12 internal electrode layers 11a1 are depicted in FIG. 1B for the sake of illustration, the number of internal electrode layers 11a1 is not limited in any way.

The primary component of the capacitor body 11 except for the internal electrode layers 11a1, or specifically the primary component of the dielectric layers 11a2 of the capacitive part 11a as well as the dielectric cover parts 11b, is barium titanate, strontium titanate, calcium titanate, magnesium titanate, calcium zirconate, calcium zirconate titanate, barium zirconate, titanium oxide, or other dielectric material (dielectric ceramic material). On the other hand, the primary component of the internal electrode layers 11a1 is nickel, copper, palladium, silver, or any alloy thereof, or other metal material.

As shown in FIGS. 1A and 1B, the first external electrode 12 continuously has a part that covers one length-direction end of the capacitor body 11, parts that partially cover both width-direction faces of the capacitor body 11, and parts that partially cover both height-direction faces of the capacitor body 11, where the lengths of the parts that partially cover both width-direction faces and those of the parts that partially cover both height-direction faces, are roughly the same. As shown in FIGS. 1A and 1B, the second external electrode 13 continuously has a part that covers the other length-direction end of the capacitor body 11, parts that partially cover both width-direction faces of the capacitor body 11, and parts that partially cover both height-direction faces of the capacitor body 11, where the lengths of the parts that partially cover both width-direction faces and those of the parts that partially cover both height-direction faces, are roughly the same. It should be noted that the thickness of the first external electrode 12 and that of the second external electrode 13 are each set to a range of 5 to 30 μm regardless of the size of the capacitor body 11, or to a range of 5 to 10 μm for slim-type capacitors.

The primary component of the first external electrode 12 as well as the second external electrode 13, is nickel, copper, palladium, silver, or any alloy thereof, or other metal material, and preferably nickel, copper, or other base metal material (including alloy of base metals). Also, the first external electrode 12 and second external electrode 13 may contain, as a secondary component, the dielectric material (such as barium titanate as discussed above) that constitutes the primary component of the capacitor body 11 except for the internal electrode layers 11a1.

As is evident from FIG. 2, which was drawn based on an image of a randomly selected section obtained using a scanning transmission electron microscope (STEM-EDX), metal grains MP corresponding to the primary component and dielectric grains DP corresponding to the secondary component are mixed together and adhered to each other in the first external electrode 12 and second external electrode 13, respectively. Also, a metal oxide MO of the same metal element constituting the metal grain MP is present at the interface between the metal grain MP and the dielectric grain DP. This metal oxide MO is not present across the entire interface between the metal grain MP and the dielectric grain DP; instead, it is present intermittently at the interface between the two. It should be noted that the thickness of the metal oxide MO is roughly in a range of 50 nm to 500 nm (in some embodiments, 100 nm to 300 nm).

To provide supplemental explanation using an example, suppose the primary component, and the secondary component, of the first external electrode 12 and second external electrode 13, are nickel and barium titanate, respectively; in this case, the metal grain MP, dielectric grain DP, and metal oxide MO, as shown in FIG. 2, are nickel grain, barium titanate grain, and nickel oxide, respectively.

Next, an example of the method for manufacturing the multilayer ceramic capacitor 10 shown in FIGS. 1A to 2 is explained. It should be noted that the manufacturing method explained here is only one example and does not limit in any way how the multilayer ceramic capacitor 10 shown in FIGS. 1A to 2 is manufactured.

To manufacture a multilayer ceramic capacitor 10 that uses barium titanate as the primary component of the dielectric layers 11a2 of the capacitive part 11a as well as the dielectric cover parts 11b, nickel as the primary component of the internal electrode layers 11a1, and nickel as the primary component of the first external electrode 12 as well as the second external electrode 13, first a slurry containing barium titanate powder, organic solvent, organic binder, and, if necessary, dispersant and other additives, is prepared as a ceramic slurry. Also, a paste containing nickel powder, organic solvent, organic binder, and, if necessary, dispersant and other additives, is prepared as an internal electrode paste. Furthermore, a paste containing nickel powder, barium titanate powder as a common material, magnesium oxide (MgO) powder as an oxidization accelerator, organic solvent, organic binder, and if necessary, dispersant and other additives, is prepared as an external electrode paste. It should be noted that the magnesium oxide powder in the external electrode paste may be substituted by powder of magnesium carbonate ($MgCO_3$) or other magnesium compound containing oxygen element.

Next, the ceramic slurry is coated on the surface of a carrier film, and then dried, to produce a first sheet. Also, the internal electrode paste is printed on the surface of this first sheet, and then dried, to produce a second sheet on which internal electrode layer patterns have been formed.

Next, a specified number of unit sheets taken from the first sheet are stacked and thermally compressed one by one, to form an area corresponding to one dielectric cover part 11b. Next, a specified number of unit sheets (that include internal electrode layer patterns) taken from the second sheet are stacked and thermally compressed one by one, to form an area corresponding to the capacitive part 11a. Next, a specified number of unit sheets taken from the first sheet are stacked and thermally compressed one by one, to form an area corresponding to the other dielectric cover part 11b. Lastly, the entire stack of sheets is thermally compressed for one last time, to produce an unsintered multilayer sheet.

Next, the unsintered multilayer sheet is cut to a grid, to produce unsintered capacitor bodies, each corresponding to the capacitor body 11. Next, the external electrode paste is applied on both length-direction ends of the unsintered capacitor bodies by means of dip coating, roller coating, etc., and then dried, to produce unsintered external electrodes. Next, many such unsintered capacitor bodies having unsintered external electrodes are put in a sintering furnace and sintered (this process includes binder removal and sintering) all at once in a reducing atmosphere and according to a temperature profile appropriate for barium titanate and nickel.

With the multilayer ceramic capacitor 10 manufactured according to the example of manufacturing method above, nickel grains (refer to the metal grain MP in FIG. 2) and barium titanate grains (refer to the dielectric grain DP in FIG. 2) are mixed together and adhered to each other in the first external electrode 12 and second external electrode 13, respectively. Also, an oxide of nickel which is the same element constituting the nickel grain, or specifically nickel monoxide (NiO; refer to the metal oxide MO in FIG. 2)

formed by the action of the oxidization accelerator, is present intermittently at the interface between the nickel grain and the barium titanate grain.

In some embodiments, the "primary component" refers to a majority (by mass) component constituting a concerned material, and the "secondary component" refers to a non-majority (by mass) component constituting a concerned material. In some embodiments, the external electrode is a sintered material comprised of, consists essentially of, or consists of metal particles as the primary component, dielectric particles as the secondary component, metal oxide (the metal element thereof is the same metal element as in the metal particles adjacent thereto) intermittently present (as the primary metal oxide) along the interfaces between the metal particles and the dielectric particles, secondary or auxiliary metal oxide used as the oxidization accelerator, and immaterial components such as unavoidable impurities. In some embodiments, the metal oxide is discontinuously present around substantially each metal particle. In some embodiments, the metal oxide has a composition which is identified exclusively as the composition obtained by oxidizing the adjacent metal particles with the oxidization accelerator. In some embodiments, the metal oxide is present substantially exclusively or solely along the interfaces. In some embodiments, any one or more of the components or compounds listed herein can be exclusively selected or can expressly be excluded, depending on the target or concerned material, the target properties of the material, etc., and/or for practical reasons, operational reasons, etc.

Next, the effects achieved by the multilayer ceramic capacitor 10 shown in FIGS. 1A to 2 are explained.

According to the multilayer ceramic capacitor 10 shown in FIGS. 1A to 2, drop in the hardness of the first external electrode 12, or in the hardness of the second external electrode 13, can be prevented even when the first external electrode 12 and second external electrode 13 contain metal grains MP and dielectric grains DP, because an oxide of the same metal constituting the metal grain MP, or MO, is present at the interface between the metal grain MP and the dielectric grain DP and this metal oxide MO increases the bonding strength between the metal grain MP and dielectric grain DP. In addition, this prevention of drop in the hardness of the first external electrode 12 and second external electrode 13 also prevents the phenomenon of these external electrodes separating from the capacitor body 11.

Furthermore, the intermittent presence of the metal oxide MO at the interface between the metal grain MP and the dielectric grain DP reduces the strain that results from a differential lattice constant at the interface between the metal oxide MO and the metal grain MP, etc., thereby lowering the residual stress and ensuring enough contact area between the metal oxide MO and the dielectric grain DP, and as a result the interface strength will increase and consequently the hardness of the entire external electrode film will improve. Furthermore, use of metal grains MP constituted by a base metal element will help reduce cost compared to when metal grains constituted by a noble metal element are used.

Figure 3A:
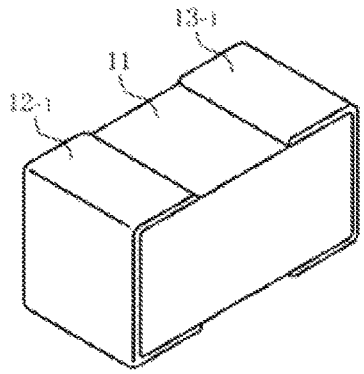
FIGS. 3A and 3B are each a drawing illustrating a different example of the shapes of the first external electrode and second external electrode shown in FIGS. 1A and 1B.

It should be noted that the first external electrode 12 and second external electrode 13 shown in FIGS. 1A and 1B can have the shapes shown in FIG. 3A, respectively. To be specific, a first external electrode 12-1 shown in FIG. 3A continuously has a part that covers one length-direction end of the capacitor body 11 and parts that partially cover both height-direction faces of the capacitor body 11, while a second external electrode 13-1 continuously has a part that covers the other length-direction end of the capacitor body 11 and parts that partially cover both height-direction faces of the capacitor body 11. Also, the first external electrode 12 and second external electrode 13 shown in FIG. 1 can have the shapes shown in FIG. 3B, respectively. To be specific, a first external electrode 12-2 shown in FIG. 3B continuously has a part that covers one length-direction end of the capacitor body 11 and a part that partially covers one height-direction face of the capacitor body 11, while a second external electrode 13-2 continuously has a part that covers the other length-direction end of the capacitor body 11 and a part that partially covers one height-direction face of the capacitor body 11. In other words, effects similar to those described above can still be achieved with the external electrode shapes shown in FIG. 3A or the external electrode shapes shown in FIG. 3B.

Figure 3B:
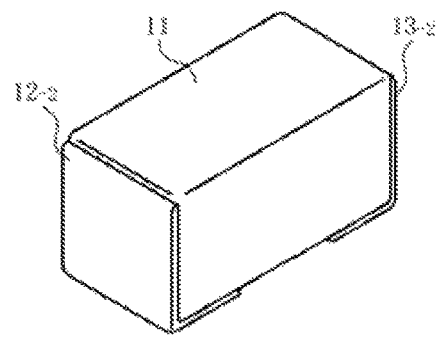

Also, the first external electrode 12 and second external electrode 13 shown in FIGS. 1A and 1B, including the first external electrode 12-1 and second external electrode 13-1, as well as the first external electrode 12-2 and second external electrode 13-2, as shown in FIGS. 3A and 3B, need not have a single-layer structure. In other words, effects similar to those described above can still be achieved with a multi-layer structure where one or more separate metal film(s), such as a plating film(s), is/are formed on the surface of the first external electrode and that of the second external electrode.

Furthermore, while the explanation using FIGS. 1A and 1B did not clearly indicate the relationship or dimension values of the length, width, and height of the multilayer ceramic capacitor 10, these length, width, and height can have a relationship of "length>width=height," or it can have a relationship of "length>width>height," "length>height>width," "width>length=height," "width>length>height," or "width>height>length," and the dimension values of the length, width, and height are not limited in any way. In other words, effects similar to those described above can still be achieved regardless of the relationship or dimension values of the length, width, and height of the multilayer ceramic capacitor.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-103040, filed May 24, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor using external electrodes that contain metal grains and dielectric grains, wherein a metal oxide of a same metal element constituting the metal grain is present at an interface between the metal grain and the dielectric grain of the external electrodes, wherein the dielectric grains contain barium titanate.

2. A multilayer ceramic capacitor according to claim 1, wherein the metal oxide is present intermittently at the interface between the metal grain and the dielectric grain.

3. A multilayer ceramic capacitor according to claim 1, wherein a metal element constituting the metal grain is a base metal element.

4. A multilayer ceramic capacitor according to claim 2, wherein a metal element constituting the metal grain is a base metal element.

5. A multilayer ceramic capacitor according to claim 1, wherein a metal element constituting the metal grain is nickel.

6. A multilayer ceramic capacitor according to claim 2, wherein a metal element constituting the metal grain is nickel.

7. A multilayer ceramic capacitor according to claim 1, wherein a thickness of the metal oxide is in a range of 50 nm to 500 nm.

8. A multilayer ceramic capacitor according to claim 2, wherein a thickness of the metal oxide is in a range of 50 nm to 500 nm.

9. A multilayer ceramic capacitor according to claim 3, wherein a thickness of the metal oxide is in a range of 50 nm to 500 nm.

10. A multilayer ceramic capacitor according to claim 4, wherein a thickness of the metal oxide is in a range of 50 nm to 500 nm.

11. A multilayer ceramic capacitor according to claim 5, wherein a thickness of the metal oxide is in a range of 50 nm to 500 nm.

12. A multilayer ceramic capacitor according to claim 6, wherein a thickness of the metal oxide is in a range of 50 nm to 500 nm.

13. A multilayer ceramic capacitor according to claim 1, wherein the external electrodes are formed, opposing each other, on two end faces of a capacitor body, wherein the capacitor body is constituted by a capacitive part including internal electrode layers, and dielectric cover parts formed on upper and lower faces of the capacitive part, respectively, wherein a primary component of the capacitor body, except for the internal electrode layers, is barium titanate which is the same component contained in the dielectric grains of the external electrodes.

* * * * *